March 24, 1970  TAIICHI ONO  3,502,760
METHOD OF MOLDING PATTERNED THERMOPLASTIC BODIES
Filed March 6, 1967  2 Sheets-Sheet 2

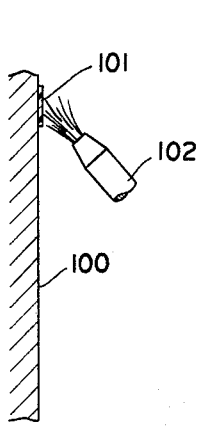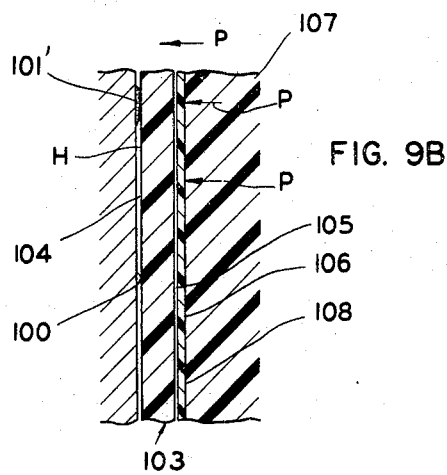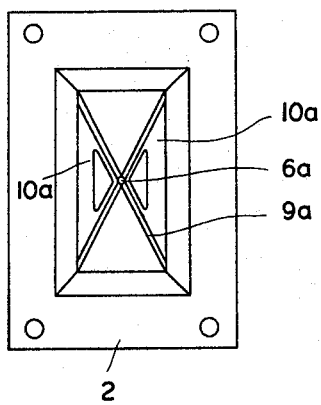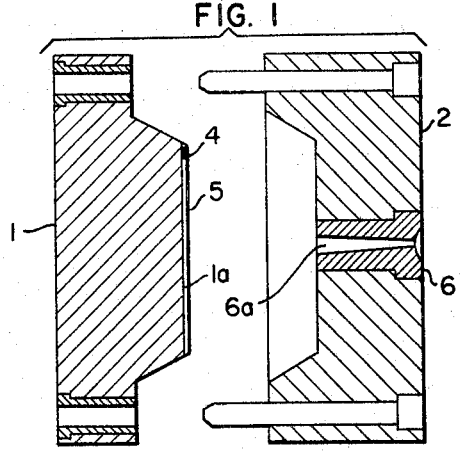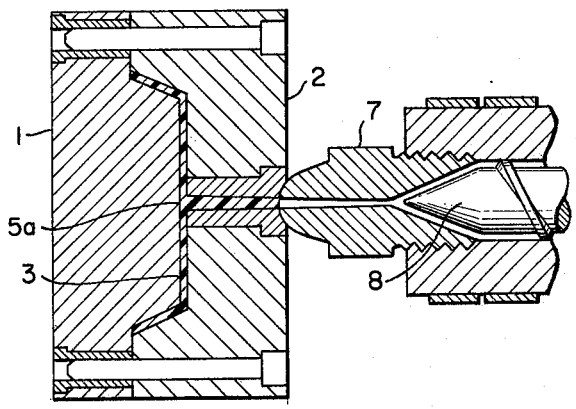

TAIICHI ONO
INVENTOR.

BY Karl F. Ross
Attorney 3,502,760
METHOD OF MOLDING PATTERNED
THERMOPLASTIC BODIES
Taiichi Ono, 4–88 Biwajima-Dori, Nishi-ku,
Nagoya, Japan
Filed Mar. 6, 1967, Ser. No. 621,489
Int. Cl. B29d 9/00; B32b 31/12
U.S. Cl. 264—135　　　　　　　　　　　　　　　2 Claims

ABSTRACT OF THE DISCLOSURE

Method of molding patterned thermoplastic bodies in a separable mold wherein a contact or pressure-sensitive thermal release adhesive containing dimethylsiloxane is applied at one or more points over only part of one surface of the mold an is heat-treated (by a flame) to render the adhesive viscous, a patterned sheet such as a printed cellulose acetate foil is applied initially with light (e.g. finger) pressure to this surface and is held by the adhesive, the thermoplastic material is injected in a hot state under pressure into the mold and initially retains the inset against the adhesive with the higher molding pressure and thereafter heats the adhesive through the foil to enable release of the body, and after at least preliminary cooling the solid thermoplastic body is withdrawn from the mold. The foil may be composed of a material not readily bondable to the thermoplastic and is treated upon its surface remote from the mold face and preferably carrying the printed pattern with a heat-resistant rubber bonding layer (e.g. of chloroprene) to effect adhesion to the thermoplastic. The mold is formed with a pair of channels extending diametrically away from the sprue opening to the remote corners of the mold.

---

My present invention relates to a method of molding thermoplastic bodies with inserts or insets carrying a pattern and, more particularly, to the improved insetting of such patterned inserts.

It has been recognized in the art of injection-molding that patterning methods involving the application by printing, decalcomania or hand or machine painting, to the exposed surfaces of a molded body are disadvantageous because the patterned surface has a tendency to wear or become eroded with washing, use and frictional contact with other objects. It has, therefore, been proposed to inset the pattern in the molded body by affixing a foil of a thermoplastic similar or identical with the molding material to one face of the mold, the other surface of the foil being imprinted or patterned by conventional techniques. Thereafter, the hot molding material is injected under pressure into the mold and transfers heat at least to the edges of the foil to merge the foil with the molding plastic and form the body into a unitary or integral hole in which the foil is not distinguishable from the remainder of the body. Thus the foil acts as a protective film overlying the pattern which is incorporated in the interior of the molded object and is thus fully protected against wear. In these methods, the foil is affixed to the surface of the mold cavity by electrostatic attraction or by cutting the foil to conform to the cavity so as to be retained thereon by friction. These techniques have the disadvantage that electrostatic electric forces decrease in humid atmosphere while friction adhesion to the mold is insufficient under the elevated molding pressures to prevent shifting of the foil. Accordingly, the foil becomes disoriented or askew and renders the finished body defective.

It is, therefore, the principal object of the present invention to provide an improved method of molding patterned thermoplastic bodies in which the pattern is integrated into the body of the article.

A further object of this invention is to provide a method of molding patterned thermoplastic bodies which is relatively efficient, inexpensive and yields objects of reproducible and uniformly good quality.

These objects and others which will become apparent hereinafter are attained, in accordance with the present invention, by a method of molding thermoplastic bodies with a closable mold having a male portion and a female portion, the latter being provided with a sprue opening, which involves the initial application to at least one and preferably a plurality of locations of a surface of the male mold portion and only over a minor fraction of the area thereof of a contact-type or pressure-sensitive adhesive layer having thermal-release properties so as to be capable of adhering the patterned foil to the mold surface upon the application of pressure against the foil and thereafter retaining the foil with weakened bonding force upon heating of this layer. After initial application of the foil to the mold surface, preferably along a face of the foil opposite that which is provided with the pattern by limiting printing, painting or the like, a hot moldable thermoplastic material is injected into the mold cavity under pressure to increase the bonding effect temporarily by virtue of the increased pressure. The hot molding material which may be of the same nature as the foil or of a different nature as noted below, transfers heat to the temperature-sensitive thermal-release adhesive to weaken the bond between the face of the molded object into which the patterned foil is indicated and the mold. Thus, upon at least an initial cooling of the molded material to partially solidify the article, the latter can be removed from the mold.

According to a specific feature of this invention, after the pressure-sensitive adhesive is applied to the mold surface at one or more points thereof, it is subjected to a flame treatment to increase its viscosity and effect a relatively firm bond thereof to the mold surface, thereby permitting the adhesive to be retained on the mold upon removal of the molded article. I have found, surprisingly, that silicone-type pressure-sensitive adhesives constitute a suitable class of thermal-release contact-bonding materials of the nature contemplated herein. The term "silicone-type adhesive" is used generically to identify a variety of commercially available alkyl-siloxane adhesives in which the dialkyl siloxane is dissolved in a solvent and is applied in solution form to the mold, the solvent being thereafter evaporated during the flame treatment (e.g. with a gas-air torch) to increase the viscosity of the adhesive spots. Best results are obtainable with dimethyl siloxane adhesive. I have discovered that an adhesive of this latter type has a long-term bonding effectiveness which is only temporarily reduced upon heating during the thermal-release step and is retained on the mold face in an active condition through many molding cycles (e.g. from 10–40).

Thus, an important aspect of this invention resides in the initial application of the adhesive and the flame treatment thereof, with the initial molding step being followed by numerous similar molding steps, each involving the application of a respective foil to the adhesive spots, without requiring reapplication of the adhesive material. Furthermore, while the term "foil" has been used herein because the patterned inset will generally be composed of a thermoplastic film or layer, it is intended to identify by this expression sheet materials of all sorts that may be retained in the molded body. Similar "foils" of this latter character include fabrics, cellulosic-fiber sheets (e.g. paper), natural objects such as leaves or other plant parts and even metallic foils or sheets. Preferably, these insets are coated or impregnated with a thermoplastic material so as to ensure protection of the material and firm bonding to the adhesive spots under the molding pressure.

Surprisingly, it has been found that prior disadvantages of systems in which the foil shifted during the molding process are obviated by the present system, presumably because of lack between the initial pressing of the foil by the molding material against this adhesive and the subsequent thermal weakening of the adhesive bond. In fact, it is believed that the high-rate injection of the liquid thermoplastic into the mold at elevated pressures does not dissolve the inset, even if the adhesive is applied over only two spots of several cm.² in total area because the pressure of the molding material holds the foil against the adhesive and the bond between the adhesive and the foil is increased with the increase in pressure thereagainst. It is only upon the transfer of heat through the foil to the adhesive/foil interface, occurring only upon the transfer of heat through the foil to the adhesive/foil interface and upon termination of the injection of the molding material that bond-weaking occurs.

According to another aspect of this invention, foils or inset sheets composed of materials normally incapable of bonding to the molding material can be effectively employed by applying to the foil or inset sheet, along its interior face (with respect to the finished article), a relatively thin film of a bonding agent of a thermoplastic character. This bonding agent, preferably an elastomer such as chloroprene rubber, effects a firm bond with synthetic-resin sheet materials as well as nonplastic insets and is practically invisible in the finished body. Thus, an important feature of this invention resides in the coating of a bonding layer, preferably of chloroprene dissolved in a solvent, onto a face of the foil or other inset-sheet material and the subsequent evaporation of the solvent. This operation may be carried out continuously, the strip being severed at the sides of the insets upon cooling of the rubber coating. The coating is applied over the pattern carried by the inset sheet and also serves to protect the pattern during the injection-molding process.

The term "patterned" as used herein, is intended to indicate substantially all techniques whereby legible or decorative materials are formed on the foil. Thus, when the latter is a cellulose acetate film, the pattern may be applied by laminating, silk screen, or other imprinting techniques, hand or machine painting or the like; alternately, the pattern may involve the texturing of the sheet or foil or the selection of a textured sheet material and/or the use of a foil having a decorative configuration.

The above and other objects, features and advantages of the present invention will become more readily apparent from the following description, reference being made to the accompanying drawing in which:

FIG. 1 is a vertical cross-sectional view of a mold, according to this invention, during the injection operation;

FIG. 2 is a cross-sectional view of this mold in an open condition, showing the application of the pattern foil thereto;

FIGS. 9A through 9B represent detailed cross-sectional views drawn to similar enlarged scales diagrammatically illustrating this invention; and FIG. 10 is an elevational view of the female mold portion.

Figure 3:
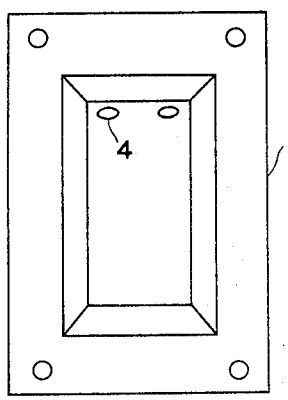
FIG. 3 is an elevational view of the male mold portion after the application of the adhesive spots.
Figure 4:
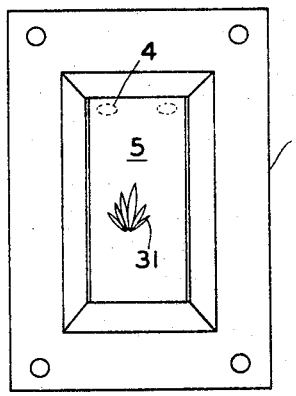
FIG. 4 is a view similar to FIG. 3 after the application of the patterned foil.

Referring first to FIGS. 9A through 9B, it can be seen that the present invention involves, in principle, the application to a die face 100, preferably the male die member 1, one or more spots 101 of a pressure- or contact-type thermal-release adhesive which is subjected to a flame-treatment by a torch 102 to evaporate solvent from the adhesive spot 101 and increase the viscosity thereof. This highly viscous adhesive spot is illustrated at 101' in FIG. 9B and is bonded strongly to the die face 100 so as to preferentially adhere to the latter through at least several molding steps.

A foil 103, here shown to be composed of a thermoplastic material, is applied against the adhesive spot 101' with finger pressure as represented at p so that the unprinted face 104 of this foil lies along the mold surface 100 and is affixed by the adhesive spot thereto. Prior to mounting this foil on the surface 100, the foil is imprinted as represented by the patterned layer 105 by any conventional imprinting or patterning process and receives a coating 106 of a chloroprene bonding agent as is described in greater detail below with reference to FIG. 8; this chloroprene layer is cured before insertion of the foil.

When a hot mass of liquid thermoplastic 107 is injected into the mold cavity, it bears against the foil 103 with a pressure P, further increasing the bond between this foil and the adhesive spot 101'. Concurrently, but with a slight lag determined by the thermal conductivity of the foil 103, heat is transmitted from the plastic mass 107 to the interface between the foil 103 and the adhesive spot 101', thereby increasing the temperature of the adhesive and weakening the bond with the foil 103. Upon an initial setting of the mass 107, it is found that a firm bond develops at the interface 108 between the thermoplastic 107 and the layer 106 of the chloroprene bonding agent. Simultaneously, the bond to the adhesive 101' has been weakened and the integrated body can be withdrawn from the mold. When the foil 103 and the thermoplastic mass 107 are of the same material or mutually fusible materials, the bonding layer 106 can be dispensed with, while mutual merging of the foil and the thermoplastic occurs at their common interface.

In FIG. 2, I show the mold assembly which comprises a male mold portion 1 and a female mold portion 2 adapted to form a mold cavity upon closure of the mold assembly which may be of the type conventionally used in an injection-molding press. The female mold portion 2 is formed with a sprue whose sprue opening 6a communicates with the mold cavity 3. When the mold is in its open conditon (FIG. 2), two spots 4 of the pressure-sensitive or contact-type thermal-release adhesive are applied over a limited area of the mold surface 1a of this cavity juxtaposed with the sprue opening 6a in the female portion 2. After heat treatment (FIGS. 9A and 9B), the patterned foil 5 is placed by finger pressure against the face 1a of the male mold portion and is retained upon by the adhesive spots 4. The female mold portion (FIG. 10) is formed with a pair of diagonally extending relatively deep grooves 9a adapted to distribute the injected thermoplastic material to the remote corners of the male and shallower recesses 10a, likewise facilitating the distribution and flow of the material substantially uniformly over the entire surface of the foil 5.

When the mold 1, 2 is closed (FIG. 1) and plastic in a hot liquid condition (5a) is injected into the mold cavity 3, the injection-molded liquid retains the foil 5 against the mold surface 1a with the increased pressure of the molding press whose nozzle 7 and extruder screw 8 urge the material into the layer at relatively high speed. The elevated pressure increases temporarily the bonding strength of the adhesive spots 4, thereby ensuring unaltered positioning of the foil during the molding process. The mold portions 1 and 2 are water-cooled by conventional means (not shown) so that the mold bodies themselves remain at a temperature below 100° C., thereby preventing weakening of the bond between the adhesive spots 4 and the mold face 1a. During the molding process, however, heat is communicated through the foil 5 to the interface between the latter and the spots 4 to weaken the bond between foil and adhesive, as described with reference to FIGS. 9A and 9B. It may be observed that the temperautre of the injected plastic usually lies in the range of 150° C. to 300° C. and that siloxane-type adhesives retain their bonding strength at temperatures of 100° C. or below but lose bonding strength when heated above 150° C; the bonding strength is regained upon cooling of the adhesive so that, upon the removal of the finished article and cooling of the adhesive spots, a subsequent cycle may be commenced by the application of another foil 5 against these spots 4 without the need to apply additional adhesive material. The molding cycle is then repeated.

Figure 5:
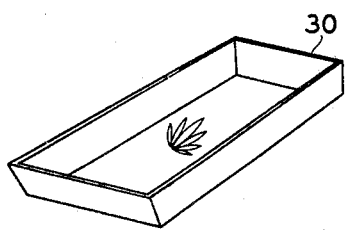
FIG. 5 is a perspective view of the article made by this mold.
Figure 6:
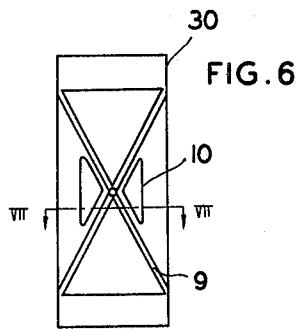
FIG. 6 is a bottom view of this article.
Figure 7:
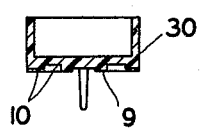
FIG. 7 is a cross-sectional view taken along the line VII—VII of FIG. 6.

As illustrated in FIGS. 6 and 7, the molded article is obtained with a pair of relatively thick ribs 9 extending diagonally across the base of the tray 30 (FIG. 5) as well as relatively lower lands 10 as formed by the grooves 9a and 10a, respectively. The siloxane adhesives have been found to withstand 10 to 40 molding cycles, to be substantially unaffected by moisture, and to have excellent thermal-release characteristics as previously described.

When the foil 5, here shown to be imprinted along its surface confronting the sprue opening 5a with a flower pattern 31, is composed of a material normally nonbonding with the thermoplastic mass and selected, for example, to have good printability or otherwise chosen because of its patterning capabilities, a coating of the bonding agent is applied prior to insertion of the insert into the mold. It may be noted here that polyolefins, an important injection-moldable type of plastic, do not form as a general rule foils which may be readily imprinted or patterned; furthermore, many patterned foils have the disadvantage that their pattern is detrimentally altered in the region of the sprue opening 6a by the rapid and high pressure flow of the hot liquid plastic into the mold cavity. The bonding agent forms both a protective layer and a layer facilitating integration of the inset into the molded article.

Figure 8:
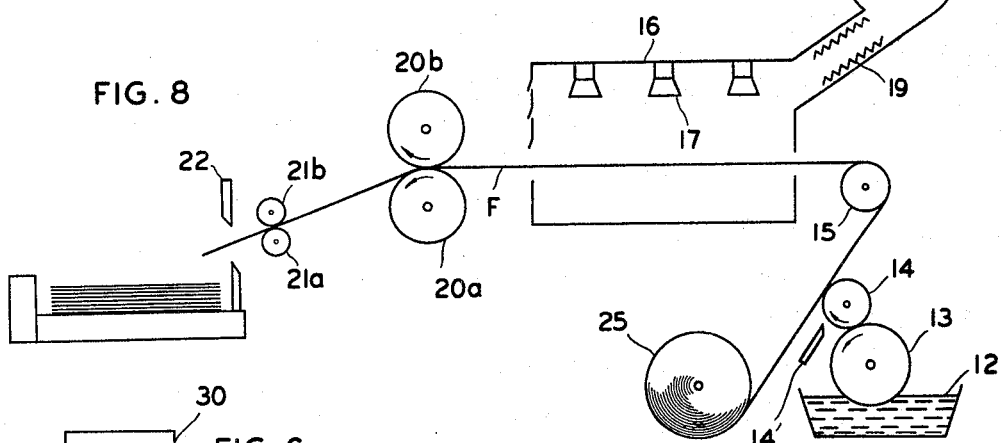
FIG. 8 is a diagrammatically elevational view illustrating an apparatus for coating the foil according to this invention.

As represented in FIG. 8, therefore, a continuous film F, previously imprinted on its subsequently coated surface and having a thickness of substantially 0.02 and 0.1 mm., is paid off a supply roll 25 and is coated upon its printed face by a coating roller 14 which, in turn, receives the bonding solution from a pickup roller 13. The latter, rotating, contacts with roller 14 and dips into a bath 12 of the bonding solution, while a doctor plate 14' ensures uniform application of the bonding layer upon the roller 14. The bonding solution in tray 12 is preferably a solution of a synthetic resin consisting essentially of chloroprene synthetic rubber dissolved in a solvent (e.g. toluene or toluol) and is heat-resistant in the sense that it is not physically altered by temperatures of the injection-molding level but retains its ability to bond firmly to the thermoplastic at these temperatures.

The coated foil F passes around a roller 15 and through a drying chamber 16 in which the coated surface is subjected to heating by infrared lamps 17 while a hot-air blast is forced over the foil from a blower 18 and a pair of heating elements 19 to carry even the evaporated solvent; the latter may be recovered by conventional techniques. Thus the adhesive or bonding layer (106 in FIG. 9B) can have a thickness such that the total foil thickness ranges from 0.05 to 0.2 mm. From the curing chamber 16, the foil F passes between a pair of calendering rollers 20a and 20b which concurrently serve to advance the foil F continuously through the system. Downstream of the rollers 20c and 20b, the foil F passes between a pair of guide rollers 21a and 22b and thence to a coating device represented by the shear blades 22 which sever the foil into pieces of the desired dimensions. The foil may then be stacked and, when necessary during the injection-molding operation, can be individually applied to the mold cavity in the manner described. Coating can be carried out with foils of cellulose acetate or with sheets of paper, cloth, leather, wooden flakes or wood composition and metallic sheets. The exposed face of the foil (with reference to the finished body) is preferably coated with cellulose acetate when these other sheet materials are employed, while the heat-resistant rubber layer is applied to the interior face.

EXAMPLE I

An ornamental pattern was silk-screened onto one side of a cellulose-acetate sheet of film, with a heat-resistive ink. After the ink had dried, the printed sheet was cut to the desired size. A set of die halves used for injection-molding a tray-shaped product as shown in FIG. 1 (length=300 mm., width=180 mm., mean thickness=2.5 mm.) was mounted on an in-line screw-type injection-molding machine whose clamping capacity was 200 tons. Then a heat-resistive, pressure-sensitive silicone adhesive (i.e. dimethylsiloxane-based adhesive) was applied to the two spots (5 cm.$^2$) with a thickness of 0.05 mm. (as shown in FIG. 3), whereupon direct flame heating (FIG. 9A) was applied by a torch lamp for 4 to 5 seconds. This direct heating was applied until the adhesive had developed optimum viscosity. After this step, the film was fixed in place with finger pressure against the treated spots, the cavity was closed and then cellulose acetate (liquefied from pellet form), molten at the temperature of 220° C., was injected into the cavity with the injection pressure of 950 kg./cm.$^2$ and an injection rate of 60 cm.$^3$/sec. The molded product, as illustrated in FIG. 5, was ejected after a cooling time of 20 seconds with the total operation cycle time of 35 seconds. The single application of the heat-resistive and pressure-sensitive adhesive spots withstand repeated molding operations of 20 to 25 times.

EXAMPLE II

Ornamental patterns and characters were printed with a heat-resistive ink on one side of a long continuous sheet of cellulose acetate film. In the next step, the printed side of the said film was coated with a heat-resistive bonding agent (layer 106 in FIG. 9B) in the form of solution (in toluene) consisting essentially of a commercially available chloroprene-type synthetic rubber. After drying the film thus treated was cut to the same size as the one of Example I, with the resultant thickness of 0.1 mm. Just as in the case of Example I, the film was fixed with adequate pressure onto the spots of the cavity surface, upon which the heat-resistive and pressure-sensitive thermal release adhesive had been applied and flame-treated; the die was closed and molten high-impact polystyrene was injected into the cavity at a temperature of 280° C., an injection pressure of 1100 kg./cm.$^2$ and an injection rate of 70 cm.$^3$/sec. The molded product was ejected after a cooling time of 25 seconds with a total operating cycle time of 42 seconds. This time, the single application of the pressure-sensitive adhesive could withstand the repeated operation of 33 times.

EXAMPLE III

An ornamental pattern was printed on one side of a sheet of paper, made from rayon pulp and 0.1 mm. thick, by means of a rotogravure printing press; then it was impregnated with solvent-dissolved melamine resin. The resultant thickness of the said sheet of paper was 0.18 mm. The printed side of sheet was coated with heat-resistive bonding-agent in the same fashion as in Example II. After the bonding agent was dry, the processed sheet, with a resultant thickness of 0.18 mm., was fixed with finger pressure onto the spots of the cavity surface upon which the heat-resistive and pressure-sensitive adhesive had ben applied and heat treated; the die was closed and molten high-impact polystyrene was injected into the cavity with a temperature of 270° C., an injection pressure of 1000 kg./cm.$^2$, and an injection rate of 70 cm.$^3$/sec. The molded product was ejected after a cooling time of 30 seconds with the total operation cycle time of 45 seconds. The single application of the heat-resistive and pressure-sensitive bonding agent withstood 30 injection-molding cycles.

I claim:
1. A method of molding patterned thermoplastic bodies with a closable mold having a male portion and a female portion, comprising the steps of:
   (a) applying to a surface of one of said mold portions, over only a limited area thereof, a layer of a contact-type thermal-release silicone adhesive composed at least in part of dimethyl siloxane adapted to bond to a face applied with pressure thereagainst and to weaken in bonding force upon the heating of said layer;
   (b) affixing a face of a patterned foil to said layer, said foil having another face provided with a pattern;
   (c) applying to said foil, along its face opposite that which is affixed to said adhesive layer, a coating of a heat-resistant rubber-based bonding agent to facilitate the joining of said foil to the injected material, said coating being a chloroprene rubber dissolved in a solvent, and heating the coating to evaporate said solvent prior to the mounting of the foil in said mold;
   (d) Flame treating said adhesive layer upon its application to said surface to increase the viscosity of the layer, said adhesive layer being retained upon said mold surface after removal of said body;
   (e) injecting into the mold a hot thermoplastic material different from that of said foil at an elevated pressure to fill said mold and urge said foil against said adhesive layer whereby said foil is initially retained by said elevated pressure in bonding relationship with said adhesive and is thereafter heated by said material to weaken its bond with said adhesive;
   (f) cooling said material in said mold to bond said material to said foil;
   (g) thereafter removing the body of said material and said foil from said mold;
   (h) and repeating steps (a) to (g) for a plurality of molding cycles with respective applications of patterned foils to said layer and injections of said material prior to application of a further layer of adhesive.

2. The method defined in claim 1 wherein said foil is composed of or coated with cellulose acetate.

References Cited

UNITED STATES PATENTS

| 3,122,598 | 2/1964 | Berger | 264—328 |
| 3,076,773 | 2/1963 | Foster | 156—289 |
| 3,246,066 | 4/1966 | Gits | 264—135 |
| 1,744,438 | 1/1930 | Benson. | |
| 2,985,554 | 5/1961 | Dickard | 156—344 |

FOREIGN PATENTS

| 453,613 | 9/1936 | Great Britain. |
| 884,466 | 12/1961 | Great Britain. |

ROBERT F. WHITE, Primary Examiner

R. SHEAR, Assistant Examiner

U.S. Cl. X.R.
264—247, 294